United States Patent
Hanrahan et al.

(10) Patent No.: US 10,364,749 B2
(45) Date of Patent: Jul. 30, 2019

(54) COOLING AIR HEAT EXCHANGER SCOOP

(71) Applicant: United Technologies Corporation, Hartford, CT (US)

(72) Inventors: Paul R. Hanrahan, Farmington, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 396 days.

(21) Appl. No.: 14/974,779

(22) Filed: Dec. 18, 2015

(65) Prior Publication Data

US 2017/0175632 A1    Jun. 22, 2017

(51) Int. Cl.
| | |
|---|---|
| *F02C 7/18* | (2006.01) |
| *F02C 7/141* | (2006.01) |
| *F02C 3/10* | (2006.01) |
| *F02K 3/06* | (2006.01) |
| *F01D 25/16* | (2006.01) |
| *F02C 6/08* | (2006.01) |
| *F02C 7/12* | (2006.01) |

(52) U.S. Cl.
CPC ............ *F02C 7/185* (2013.01); *F01D 25/162* (2013.01); *F02C 3/10* (2013.01); *F02C 6/08* (2013.01); *F02C 7/12* (2013.01); *F02C 7/125* (2013.01); *F02C 7/141* (2013.01); *F02C 7/18* (2013.01); *F02K 3/06* (2013.01); *F05D 2240/129* (2013.01); *F05D 2250/51* (2013.01); *F05D 2260/213* (2013.01); *Y02T 50/676* (2013.01)

(58) Field of Classification Search
CPC .... F01D 9/065; F02C 7/12; F02C 7/18; F02C 7/141; F02C 7/185; F02C 7/125; F02K 3/06; F05D 2250/51
See application file for complete search history.

(56) References Cited

U.S. PATENT DOCUMENTS

| | | | |
|---|---|---|---|
| 4,280,678 A | 7/1981 | Roberts | |
| 5,269,135 A * | 12/1993 | Vermejan | F02C 7/04 60/226.1 |
| 5,918,458 A * | 7/1999 | Coffinberry | F02C 7/185 60/785 |
| 6,622,475 B2 * | 9/2003 | Brault | F01D 17/105 60/226.3 |

(Continued)

FOREIGN PATENT DOCUMENTS

| | | |
|---|---|---|
| WO | 2015038374 A1 | 3/2015 |
| WO | 201510552 A1 | 7/2015 |

OTHER PUBLICATIONS

Extended European Search Report, for European Patent Application 16204962.1, dated Apr. 24, 2017, 7 pages.

(Continued)

*Primary Examiner* — Steven M Sutherland
*Assistant Examiner* — Thuyhang N Nguyen
(74) *Attorney, Agent, or Firm* — Kinney & Lange, P.A.

(57) ABSTRACT

A heat exchanger for a gas turbine engine includes a cooling air scoop that has a leading edge nose that is positioned adjacent to a downstream-most stator cascade of a fan section of the gas turbine engine. The cooling air scoop subtends only a sector of a circumference of the gas turbine engine. The heat exchanger also includes a cold side that is connected to the cooling air scoop and a hot side that is connected to a compressor section of the gas turbine engine.

20 Claims, 5 Drawing Sheets

(56) References Cited

U.S. PATENT DOCUMENTS

| | | |
|---|---|---|
| 6,817,189 B2 | 11/2004 | Boeck |
| 7,765,789 B2 | 8/2010 | Johnson |
| 8,092,153 B2 | 1/2012 | Strecker et al. |
| 2011/0088405 A1 | 4/2011 | Turco |
| 2012/0144843 A1 | 6/2012 | Donovan et al. |
| 2013/0186102 A1* | 7/2013 | Lo .............................. F02C 7/18 60/785 |

OTHER PUBLICATIONS

Extended European Search Report for EP Application No. 18186610. 4, dated Nov. 7, 2018, pp. 7.

* cited by examiner

COOLING AIR HEAT EXCHANGER SCOOP

BACKGROUND

The present invention relates generally to gas turbine engines, and more particularly to a cooling air scoop for a heat exchanger of a gas turbine engine.

A gas turbine engine typically includes a high pressure spool, a combustion system, and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a fan connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressor and the fan to sustain the combustion process.

The high energy gases contain a substantial amount of thermal energy, which is transferred to the high and low pressure turbines. Therefore, the high and low pressure turbines are cooled using air that is bled from the high pressure compressors. This cooling air can be cooled using a heat exchanger prior to flowing to the turbines in order to maximize the cooling capacity of the cooling air. In such an arrangement, the cooling air flows through the hot side of the heat exchanger, and another fluid must be used for the cold side of the heat exchanger.

SUMMARY

According to one embodiment of the present invention, a heat exchanger for a gas turbine engine includes a cooling air scoop that has a leading edge nose that is positioned adjacent to a downstream-most stator cascade of a fan section of the gas turbine engine. The cooling air scoop subtends only a sector of a circumference of the gas turbine engine. The heat exchanger also includes a cold side that is connected to the cooling air scoop and a hot side that is connected to a compressor section of the gas turbine engine.

DETAILED DESCRIPTION

Figure 1:
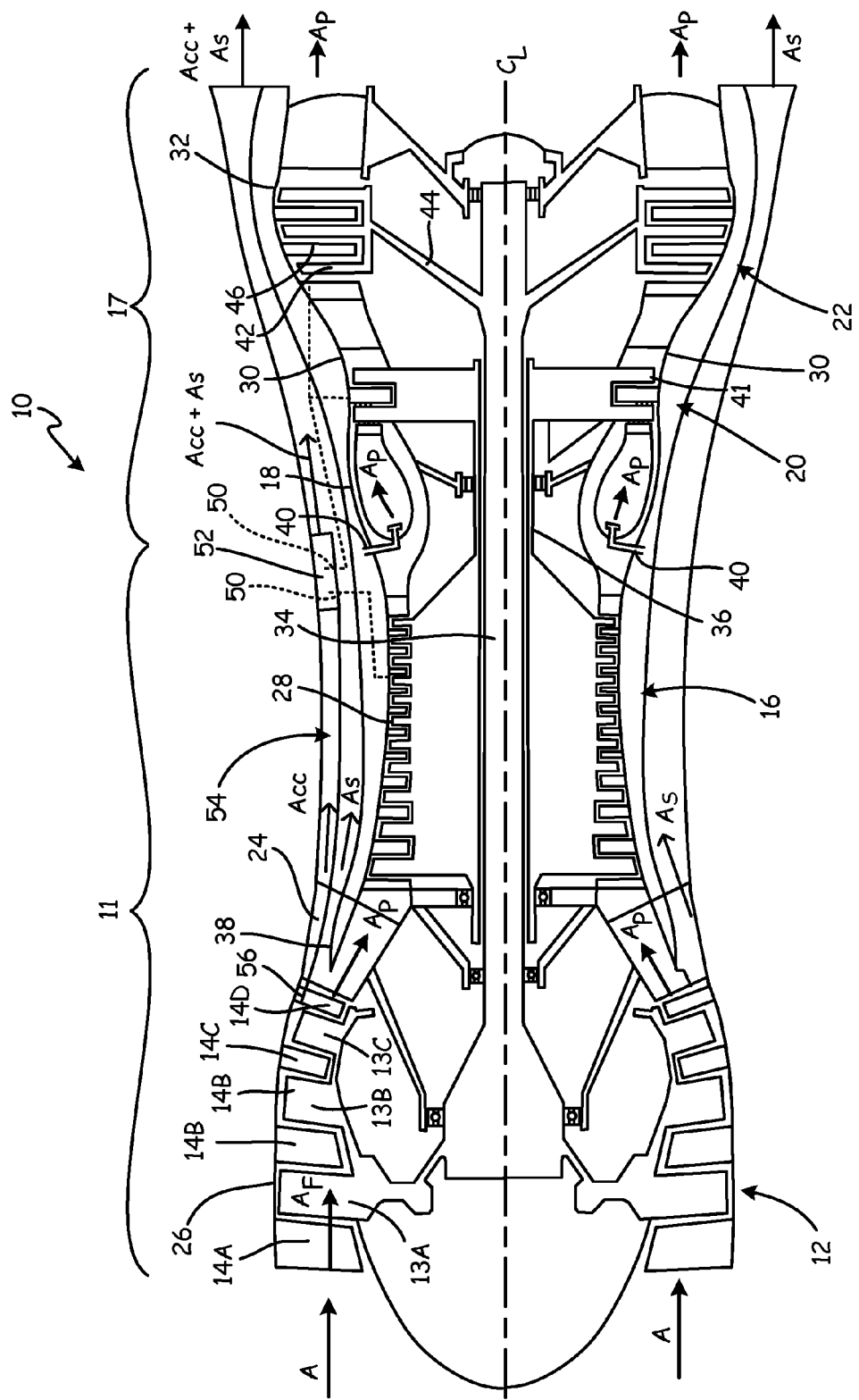
FIG. 1 is a schematic side cross-section view of an embodiment of a gas turbine engine.

FIG. 1 is a schematic side cross-section view of gas turbine engine 10. Although FIG. 1 depicts a gas turbine engine typically used for aircraft propulsion, the invention is readily applicable to gas turbine generators and other similar systems incorporating rotor-supported, shaft-driven turbines. Shown in FIG. 1 are gas turbine engine 10, cold section 11, fan 12, fan rotor cascades 13A-13C, fan stator cascades 14A-14D, high pressure compressor (HPC) 16, hot section 17, combustor section 18, high pressure turbine (HPT) 20, low pressure turbine (LPT) 22, struts 24, fan case 26, HPC case 28, HPT case 30, LPT case 32, low pressure shaft 34, high pressure shaft 36, splitter 38, injectors 40, HPT blades 41, LPT blades 42, support rotor 44, vane airfoil sections 46, cooling air gas path 50, heat exchanger 52, cooling air scoop 54, nose 56, inlet air A, fan air $A_F$, primary air $A_P$, secondary air $A_S$, cold cooling air $A_{CC}$, and longitudinal engine centerline axis $C_L$.

In the illustrated embodiment, gas turbine engine 10 comprises a dual-spool turbofan engine in which the advantages of the present invention are particularly well illustrated. Gas turbine engine 10, of which the operational principles are well known in the art, comprises cold section 11, including fan 12 and HPC 16, and hot section 17, including combustor section 18, HPT 20, and LPT 22. These components are each concentrically disposed around longitudinal engine centerline axis $C_L$. Fan 12 is separated from HPC 16 by a plurality of struts 24, and fan 12 is enclosed at its outer diameter within fan case 26. Likewise, the other engine components are correspondingly enclosed at their outer diameters within various engine casings, including HPC case 28, HPT case 30 and LPT case 32. Fan 12 is connected to LPT 22 through low pressure shaft 34, and together with fan 12, LPT 22, and low pressure shaft 34, comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 at fan 12. Fan 12 comprises fan rotor cascades 13A-13C which are rotated by LPT 22 through low pressure shaft 34 (either directly as shown or through a gearbox, not shown). In conjunction with fan stator cascades 14A-14D (between which fan rotor cascades 13A-13C are positioned, respectively), fan air $A_F$ is accelerated and compressed. At splitter 38, fan air $A_F$ is divided into streams of primary air $A_P$ (also known as gas path air) and secondary air $A_S$ (also known as bypass air). Secondary air $A_S$ produces a major portion of the thrust output of engine 10 while primary air $A_P$ is directed into HPC 16. HPC 16 includes pluralities of rotors and stators, alternately positioned, that incrementally step up the pressure of primary air $A_P$. HPC 16 is rotated by HPT 20 through high pressure shaft 36 to provide compressed air to combustor section 18. The compressed air is delivered to combustor section 18, along with fuel through injectors 40, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in HPC 16 and participating in a combustion process in combustor section 18 to increase pressure and energy, primary air $A_P$ flows through HPT 20 and LPT 22 such that HPT blades 41 and LPT blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns the rotating components of fan 12.

In addition, a portion of primary air $A_P$ can be bled off from HPC 16 for use as turbine cooling air. The turbine cooling air is cooled in heat exchanger 52 prior to being used to cool components of HPT 20 and LPT 22, so the turbine cooling air travels through cooling air gas path 50 from HPC 16 to the hot side of heat exchanger 52 and on to hot section 17. The cold side of heat exchanger 52 receives cold cooling air $A_{CC}$ from cooling air scoop 54. Cold cooling air $A_{CC}$ is a fraction of fan air $A_F$ that would have otherwise become secondary air $A_S$ at splitter 38. After cold cooling air $A_{CC}$ passes through heat exchanger 52 and cools the turbine cooling air, cold cooling air $A_{CC}$ is combined with secondary air $A_S$.

The components and configuration of gas turbine engine 10 as shown in FIG. 1 allow for a fraction of inlet air A to be used on the cold side of heat exchanger 52 to cool the turbine cooling air. This increases the cooling capacity of the turbine cooling air, which allows for higher operating temperatures in HPT 20 and LPT 22 while keeping the components therein within their allowable thermal operating ranges.

Depicted in FIG. 1 is one embodiment of the present invention, to which there are alternative embodiments. For example, engine 10 can be a three spool engine. In such an embodiment, engine 10 has an intermediate compressor between fan 12 and HPC 16 and an intermediate turbine between HPT 20 and LPT 22, wherein the intermediate compressor is connected to the intermediate turbine with an additional shaft.

Figure 2:
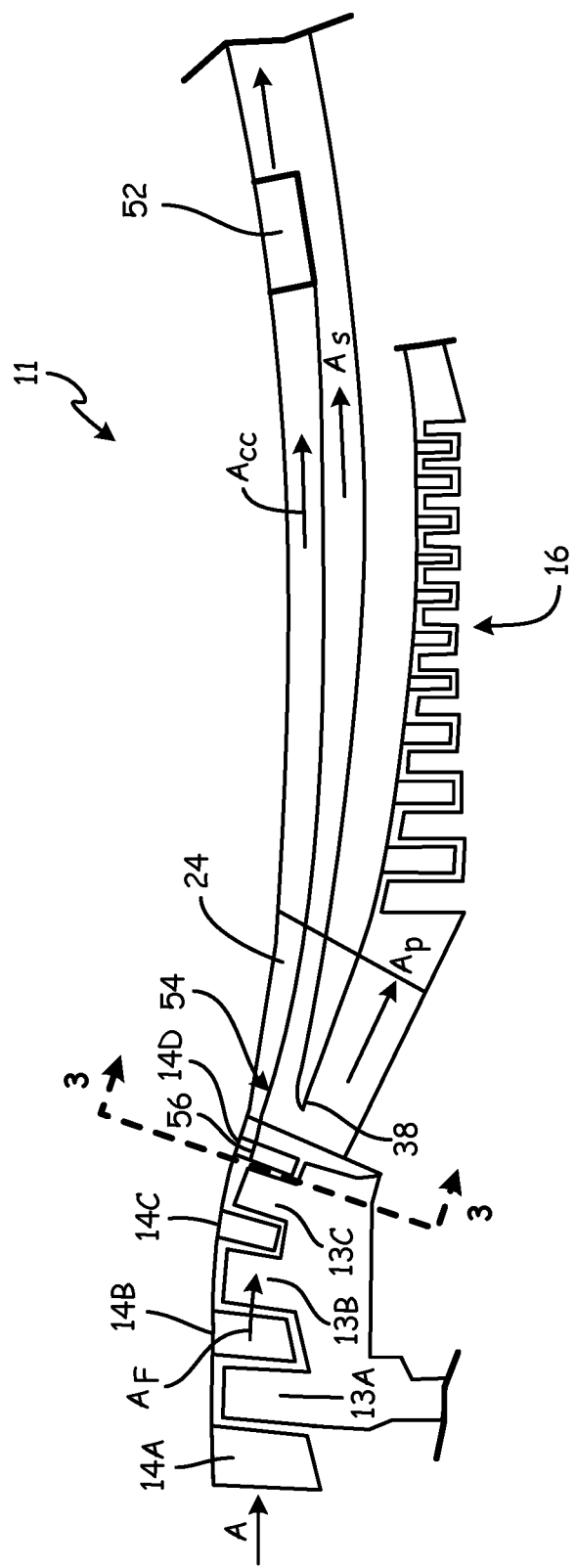
FIG. 2 is a cross-sectional view of a cold section of a gas turbine engine including a cooling air scoop.

FIG. 2 is a cross-sectional view of cold section 11. Nose 56, which is the leading edge of scoop 54, is positioned adjacent to the downstream-most fan stator cascade 14D. Specifically nose 56 is positioned at the leading edge of fan stator cascade 14D. Nose 56 is positioned at least at 50% span of fan stator cascade 14D (i.e., halfway between the radially inner end at 0% span and the radially outer end at 100% span). In another embodiment, nose 56 is positioned at least at 70% span, and in the illustrated embodiment, nose 56 is positioned at approximately 75% span (i.e., about three-quarters of the way between the radially inner end at 0% span and the radially outer end at 100% span). Thereby, scoop 54 gathers the portion of fan air $A_F$ that is passing by the leading edge of fan stator cascade 14D from 75% span to 100% span.

With respect to cold section 11, the fan warpage effect is greatest at the leading edge of fan stator cascade 14D where nose 56 is positioned. Fan warpage is the uneven pressurization of fan air $A_F$ across the span of the fan duct that causes the pressure to increase from the radially inner end to the radially outer end. Because fan air $A_F$ has been acted on by all three fan rotor cascades 13A-13C once it reaches the leading edge of fan stator cascade 14D, the fan warpage effect is highest at this point. In addition, fan air $A_F$ at this axial location is the most pressurized air in fan 12. For these reasons, nose 56 has been positioned to gather the most pressurized portion of fan air $A_F$ from the highest pressure location in fan 12. Specifically, the axial positioning of nose 56 at the leading edge of fan stator cascade 14D (downstream of all of fan rotor cascades 13A-13C) and the radial positioning of nose 56 (in the radially outer region of the span of fan stator cascade 14D) allows cold cooling air $A_{CC}$ in scoop 54 to be comprised of the highest pressure air available in fan 12. Because the pressure of secondary air $A_S$ (on average) is lower than that of cold cooling air $A_{CC}$, cold cooling air $A_{CC}$ can be flowed through the cold side of heat exchanger 52 and back into the flow of secondary air $A_S$ without additional pumping or pressurization.

Depicted in FIG. 2 is one embodiment of the present invention, to which there are alternative embodiments. For example, as stated previously, nose 56 can be positioned at 50% span to gather the air from 50% to 100% span of fan stator cascade 14D. In addition, nose 56 can be positioned at 70% span to gather the air from 70% to 100% span of fan stator cascade 14D.

Figure 3:
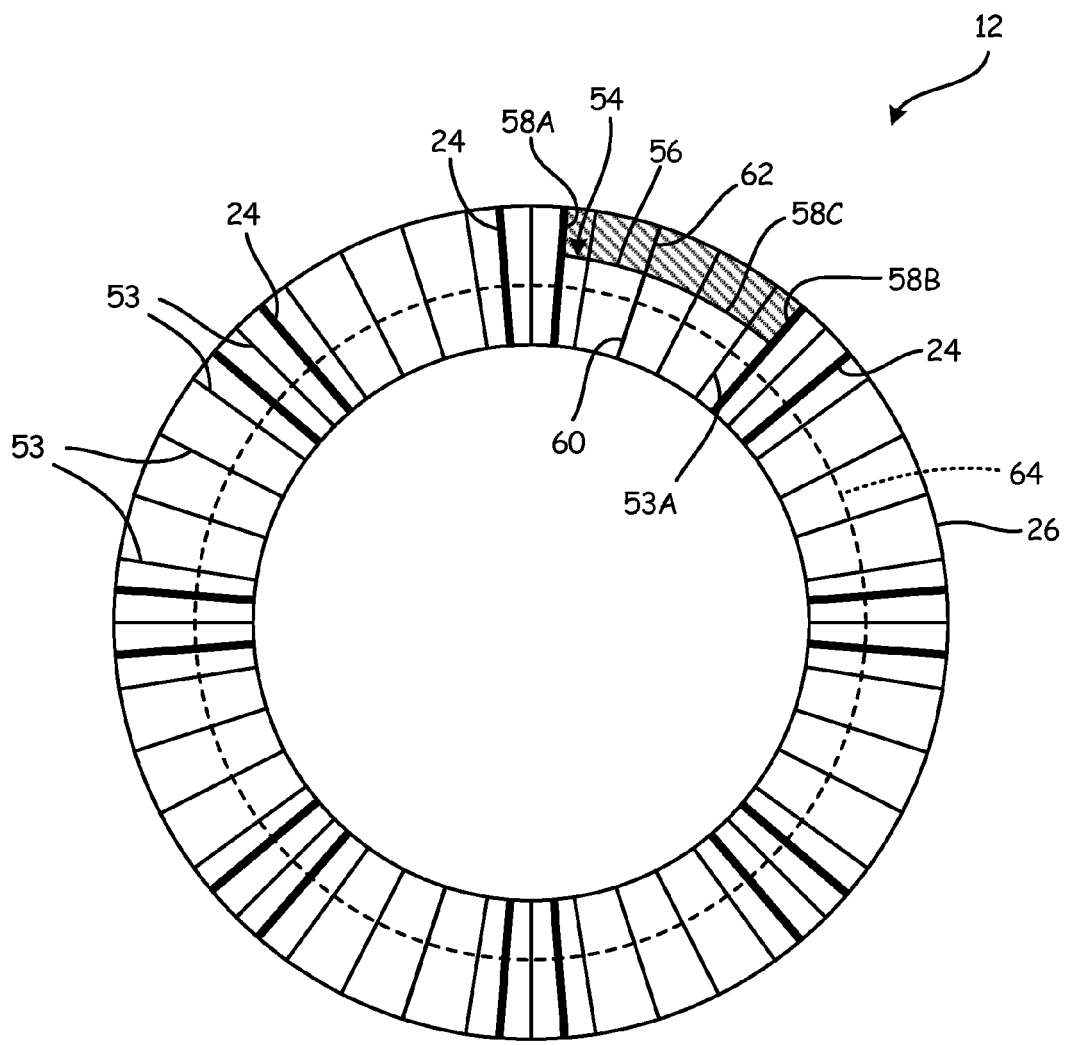
FIG. 3 is a front cross-sectional view of a fan 12 taken along line 3-3 in FIG. 2.

FIG. 3 is a front cross-sectional view of fan 12 (looking downstream) taken along line 3-3 in FIG. 2. In the plane of the view of FIG. 3, fan stator cascade 14D is visible and comprises a plurality of fan stators 53 and 53A. Behind fan stator cascade 14D are struts 24. There are a combined forty fan stators 53 and 53A, and there are eight struts 24 shown in FIG. 3, although different numbers of each of these components are possible in alternate embodiments.

In the illustrated embodiment, scoop 54 subtends only a sector of the circumference of fan 12 around gas turbine engine 10 (shown in FIG. 1), and this sector is denoted by hatching. More specifically, scoop 54 extends across a sector between the top center strut 24 and the adjacent strut 24 directly clockwise therefrom. Scoop 54 is comprised of two radially extending sides 58A and 58B and a circumferentially extending side 58C. The forth side of scoop 54 is formed by fan case 26 such that scoop 54 has the shape of an annular sector. The annular sector that scoop 54 subtends allows scoop 54 to gather approximately 5% of the total fan air $A_F$ (shown in FIG. 2).

As stated previously, side 58C is positioned at approximately 75% span with respect to each of fan stators 53 of fan stator cascades 14D. In the sector of fan stator cascade 14D that is subtended by scoop 54, fan stators 53A are utilized. Each fan stator 53A is comprised of inner airfoil 60 and outer airfoil 62 which are separated by scoop side 58C.

During operation of gas turbine engine 10 (shown in FIG. 1), scoop 54 gathers fan air $A_F$ (shown in FIG. 2) that is traveling past fan stator cascades 14D between 75% and 100% span. For reference, stream split 64 is shown to denote the eventual separation of fan air $A_F$ between primary air $A_P$ and secondary air $A_S$ downstream of this location by splitter 38 (all shown in FIG. 2). It is evident that scoop 54 is gathering fan air $A_F$ along the radially outer region of the fan duct, which is at a higher pressure than the remainder of fan air $A_F$ radially inward therefrom due to fan warpage.

Depicted in FIG. 3 is one embodiment of the present invention, to which there are alternative embodiments. For example, nose 56 can be positioned at a span location other than 50%, 70%, or 75% span. For another example, fan stators 53A can each be unitary structures. In such an embodiment, each of fan stators 53A is joined to adjacent fan stators 53A and/or sides 58A and 58B by portions of side 58C. For a further example, scoop 54 can subtend more than one sector of the cascade of struts 24. In such an embodiment, the struts 24 that are adjacent to sides 58A and 58B are not themselves adjacent and at least one of struts 24 will pass through scoop 54.

Figure 4:
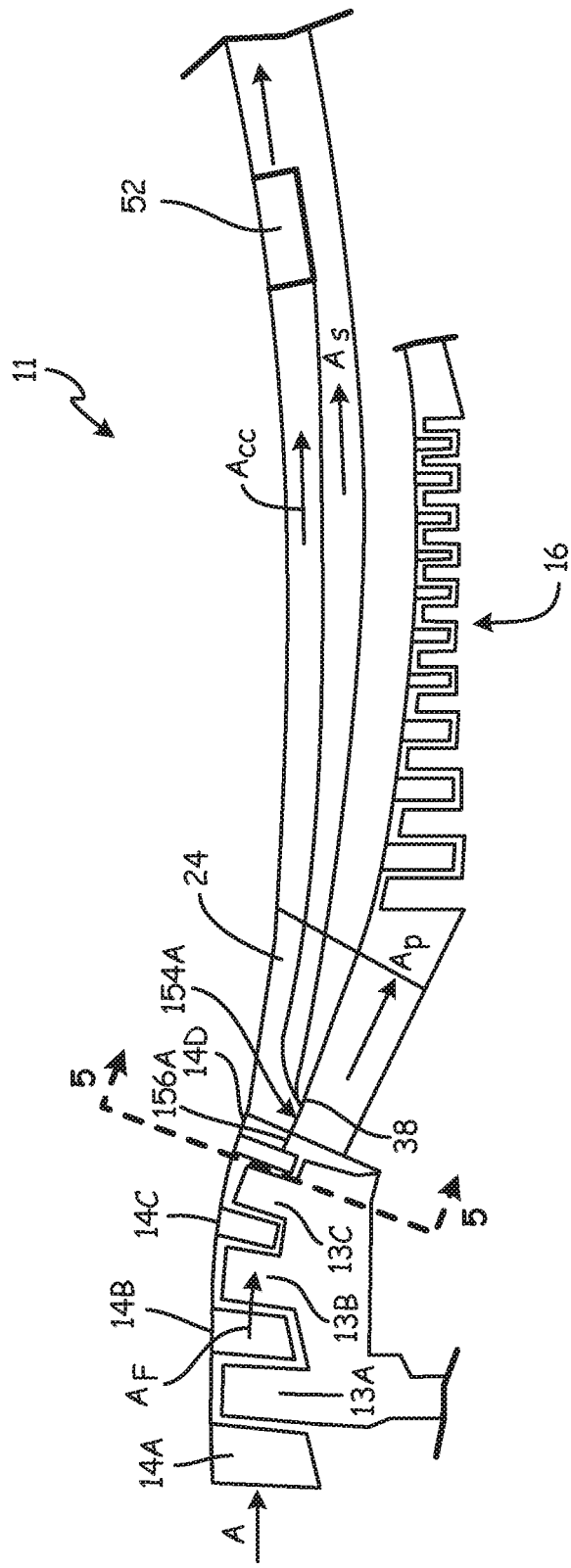
FIG. 4 is a cross-sectional view of an embodiment of a cold section of a gas turbine engine including an alternate embodiment cooling air scoop.
Figure 5:
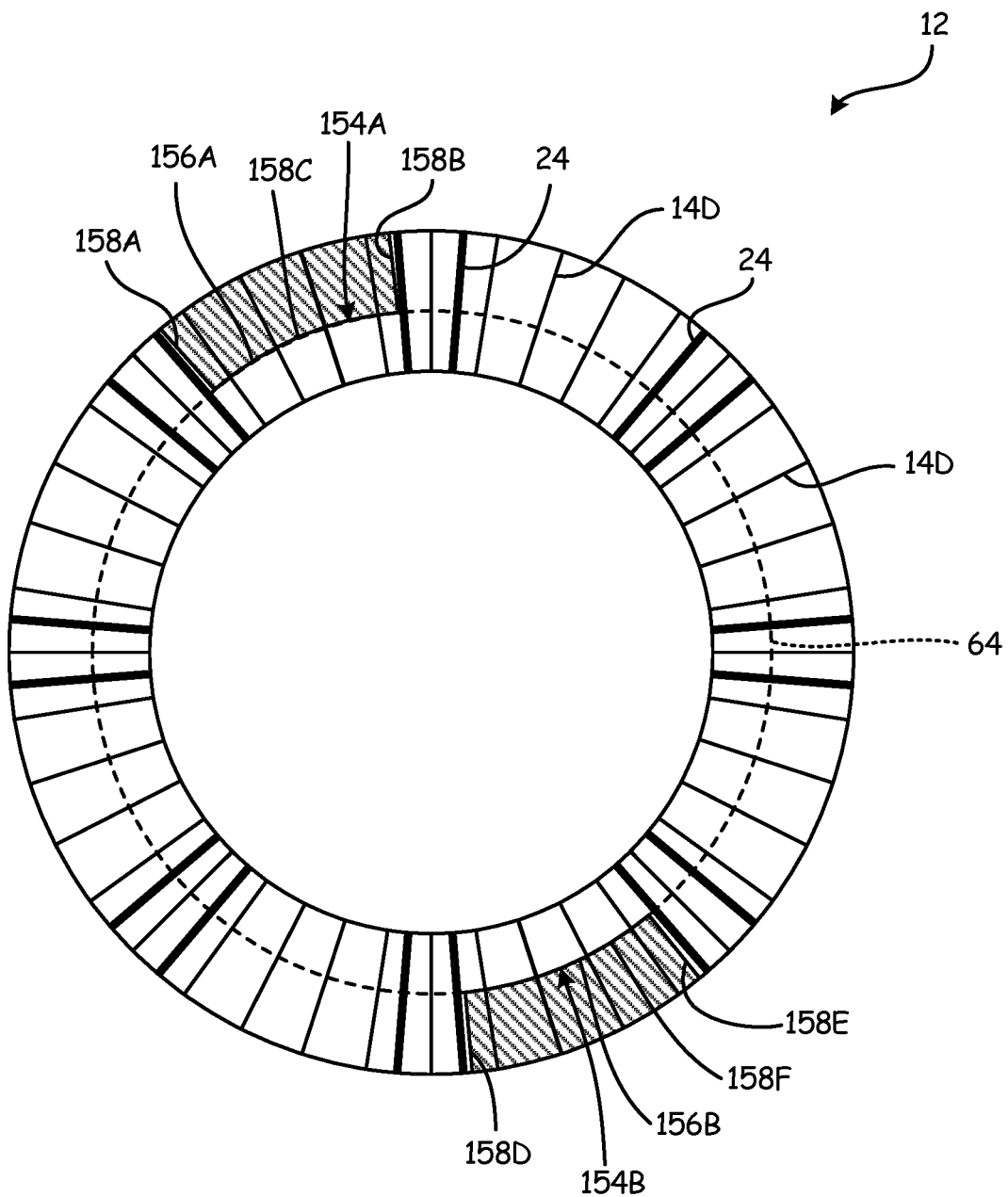
FIG. 5 is a front cross-sectional view of a fan 12 taken along line 5-5 in FIG. 4.

FIG. 4 is a cross-sectional view of a cold section of a gas turbine engine including an alternate embodiment cooling air scoop 154A and a second cooling air scoop 154B that is shown in FIG. 5. In the illustrated embodiment, nose 156A of scoop 154A is positioned adjacent to fan stator cascade 14D, specifically at the trailing edge of fan stator cascade 14D. In alternative embodiments, nose 156A is positioned between along the chord of fan stator cascade 14D, between the leading edge and the trailing edge of fan stator cascade 14D. Nose 156A also extends upstream from the leading edge of splitter 38. Thereby, scoop 154A gathers the portion of fan air $A_F$ that is passing by the trailing edge of fan stator cascade 14D that would have otherwise become secondary air $A_S$.

FIG. 5 is a front cross-sectional view of fan 12 (looking downstream) taken along line 5-5 in FIG. 4. In the plane of the view of FIG. 5, fan stator cascade 14D is visible and comprises a plurality of fan stators 53. Behind fan stator cascade 14D are struts 24. There are forty fan stators 53 and eight struts 24 shown in FIG. 3, although different numbers of each of these components are possible in alternate embodiments.

In the illustrated embodiment, there are two scoops 154A and 154B. Each of scoops 154A and 154B subtends only a sector of the circumference of fan 12 around gas turbine engine 10 (shown in FIG. 1), and these sectors are denoted by hatching. More specifically, scoop 154A extends between the top center strut 24 and the adjacent strut 24 directly counterclockwise therefrom, and scoop 154B extends between the bottom center strut 24 and the adjacent strut 24 directly counterclockwise therefrom, opposite of scoop 154A. Scoop 154A is comprised of two radially extending sides 158A and 158B and a circumferentially extending side 158C, and scoop 154B includes two radially extending sides 158D and 158E and a circumferentially extending side 158F. The fourth sides of scoops 154A and 154B are formed by fan case 26 such that scoops 154A and 154B have the shape of a sector of an annulus.

As alluded to previously, sides 158C and 158F are positioned downstream of the trailing edges of fan stators 53 of fan stator cascade 14D. Thereby, the configuration of fan stators 53 are unaffected by scoops 154A and 154B. In an alternative embodiment, noses 156A and 156B are positioned at points along the chords of the respective fan stators 53 of fan stator cascade 14D.

During operation of gas turbine engine 10 (shown in FIG. 1), scoops 154A and 154B gather all of fan air $A_F$ (shown in FIG. 4) that is traveling past fan stator cascade 14D that would otherwise have become secondary air $A_S$ (shown in FIG. 4) in their respective sectors around the circumference of gas turbine engine 10. This is indicated by sides 158C and 158F being coincident with stream split 64 in their respective sectors. It is evident that scoops 154A and 154B are gathering fan air $A_F$ along the radially outer region of the fan duct, which is at a higher pressure than the remainder of fan air $A_F$ radially inward therefrom due to fan warpage.

It should be recognized that the present invention provides numerous benefits and advantages. For example, operating the turbine sections of the gas turbine engine at higher temperatures increases the fuel efficiency of the gas turbine engine.

Discussion of Possible Embodiments

The following are non-exclusive descriptions of possible embodiments of the present invention.

A gas turbine engine according to an exemplary embodiment of this disclosure, among other possible things includes: a fan section comprising a plurality of rotor cascades and a plurality of stator cascades; a compressor section downstream of the fan section; a combustor section downstream of the compressor section; a first turbine section downstream of the combustor section, the first turbine section being connected to the compressor section; a second turbine section downstream of the first turbine section, the second turbine section being connected to the fan section; a first cooling air scoop positioned upstream of the compressor section, the first cooling air scoop comprising a leading edge nose and subtending only a first sector of a circumference of the gas turbine engine; and a heat exchanger comprising: a hot side that is fluidly connected to the compressor section; and a cold side that is fluidly connected to the cooling air scoop.

The gas turbine engine of the preceding paragraph can optionally include, additionally and/or alternatively, any one or more of the following features, configurations and/or additional components:

A further embodiment of the foregoing gas turbine engine, wherein the nose can be positioned downstream of the plurality of rotor cascades in the fan section.

A further embodiment of any of the foregoing gas turbine engines, wherein the nose can be positioned downstream of the fan section.

A further embodiment of any of the foregoing gas turbine engines, wherein the nose can be positioned at a leading edge of a downstream-most stator cascade of the plurality of stator cascades in the fan section.

A further embodiment of any of the foregoing gas turbine engines, wherein the nose can be positioned at least at 50% span of the leading edge of the downstream-most stator cascade of the plurality of stator cascades in the fan section.

A further embodiment of any of the foregoing gas turbine engines, wherein the nose can be positioned at a trailing edge of a downstream-most stator cascade of the plurality of stator cascades in the fan section.

A further embodiment of any of the foregoing gas turbine engines, wherein the nose can be positioned at least at 50% span of the trailing edge of the downstream-most stator cascade of the plurality of stator cascades in the fan section.

A further embodiment of any of the foregoing gas turbine engines, wherein the gas turbine engine can further comprise: a plurality of struts positioned between the fan section and the compressor section; wherein the first sector that the first cooling air scoop subtends extends between two adjacent struts of the plurality of struts.

A further embodiment of any of the foregoing gas turbine engines, wherein the gas turbine engine can further comprise: a splitter positioned between the fan section and the compressor section; wherein the nose extends upstream from the splitter to a leading edge of a downstream-most stator cascade of the plurality of stator cascades in the fan section.

A further embodiment of any of the foregoing gas turbine engines, wherein the gas turbine engine can further comprise: a splitter positioned between the fan section and the compressor section; wherein the nose extends upstream from the splitter to a trailing edge of a downstream-most stator cascade of the plurality of stator cascades in the fan section.

A further embodiment of any of the foregoing gas turbine engines, wherein there can be at least three stator cascades in the plurality of stator and there can be at least two rotor cascades in the plurality of rotor cascades that are alternately positioned between the four stator cascades.

A further embodiment of any of the foregoing gas turbine engines, wherein there can be only four stator cascades in the plurality of stator and there can be only three rotor cascades in the plurality of rotor cascades that are alternately positioned between the four stator cascades.

A further embodiment of any of the foregoing gas turbine engines, wherein the hot side of the heat exchanger can be also fluidly connected to at least one of the first turbine section and the second turbine section.

A further embodiment of any of the foregoing gas turbine engines, wherein the gas turbine engine can further comprise: a second cooling air scoop positioned upstream of the compressor section and subtending only a second sector of the circumference of the gas turbine engine opposite of the sector of the first cooling air scoop.

A heat exchanger for a gas turbine engine according to an exemplary embodiment of this disclosure, among other possible things includes: a cooling air scoop having a leading edge nose that is positioned adjacent to a downstream-most stator cascade of a fan section of the gas turbine engine, the cooling air scoop subtending only a sector of a circumference of the gas turbine engine; a cold side that is fluidly connected to the cooling air scoop; and a hot side that is fluidly connected to a compressor section of the gas turbine engine.

The heat exchanger of the preceding paragraph can optionally include, additionally and/or alternatively, any one or more of the following features, configurations and/or additional components:

A further embodiment of the foregoing heat exchanger, wherein the sector can be between a first strut and a second strut that are positioned downstream of the stator cascade.

A further embodiment of any of the foregoing heat exchangers, wherein the first strut can be adjacent to the second strut.

A further embodiment of any of the foregoing heat exchangers, wherein the nose can be positioned at a leading edge of the downstream-most stator cascade.

A further embodiment of any of the foregoing heat exchangers, wherein the nose can be positioned at a trailing edge of the downstream-most stator cascade.

A further embodiment of any of the foregoing heat exchangers, wherein the nose can be positioned at 75% span of the downstream-most stator cascade.

A further embodiment of any of the foregoing heat exchangers, wherein the nose can be positioned between a leading edge and a trailing edge of the downstream-most stator cascade.

A further embodiment of any of the foregoing heat exchangers, wherein the heat exchanger can further comprise: a splitter positioned downstream of the fan section; wherein the nose extends upstream from the splitter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
a fan section comprising a plurality of rotor cascades and a plurality of stator cascades, wherein the fan section defines a fan air stream;
a compressor section downstream of the fan section;
a combustor section downstream of the compressor section;
a first turbine section downstream of the combustor section, the first turbine section being connected to the compressor section;
a second turbine section downstream of the first turbine section, the second turbine section being connected to the fan section, wherein the compressor section, the combustor section, the first turbine section, and the second turbine section define a primary air stream;
a first cooling air scoop receiving a portion of the fan air stream and defining an inlet to a cooling air stream that is positioned upstream of and radially outward from a splitter, wherein the inlet divides the portion of the fan air stream into the cooling air stream and another portion of the fan air stream, the first cooling air scoop subtending only a first sector of a circumference of the gas turbine engine, wherein the first cooling air scoop comprises a leading edge nose that is radially aligned with or radially outward from a midspan of a downstream-most stator cascade of the plurality of stator cascades; and
the splitter positioned between the fan section and the compressor section dividing the another portion of the fan air stream into the primary air stream and a secondary air stream radially outward from the primary air stream;
a heat exchanger comprising:
a hot side that is fluidly connected to the compressor section; and
a cold side that is fluidly connected to the cooling air stream via the first cooling air scoop, wherein the cooling air stream combines with the secondary air stream downstream from the heat exchanger.

2. The gas turbine engine of claim 1, wherein the leading edge nose is positioned downstream of the plurality of rotor cascades in the fan section.

3. The gas turbine engine of claim 1, wherein the leading edge nose is positioned downstream of the fan section.

4. The gas turbine engine of claim 1, wherein the leading edge nose is positioned at a leading edge of the downstream-most stator cascade of the plurality of stator cascades in the fan section.

5. The gas turbine engine of claim 4, wherein the leading edge nose is positioned at least at 50% span of the leading edge of the downstream-most stator cascade of the plurality of stator cascades in the fan section.

6. The gas turbine engine of claim 1, wherein the leading edge nose is positioned at a trailing edge of the downstream-most stator cascade of the plurality of stator cascades in the fan section.

7. The gas turbine engine of claim 6, wherein the leading edge nose is positioned at least at 50% span of the trailing edge of the downstream-most stator cascade of the plurality of stator cascades in the fan section.

8. The gas turbine engine of claim 1, further comprising:
a plurality of struts positioned between the fan section and the compressor section;
wherein the first sector that the first cooling air scoop subtends extends between two adjacent structures of the plurality of struts.

9. The gas turbine engine of claim 1,
wherein the leading edge nose extends upstream from the splitter to a leading edge of the downstream-most stator cascade of the plurality of stator cascades in the fan section.

10. The gas turbine engine of claim 1,
wherein the leading edge nose extends upstream from the splitter to a trailing edge of the downstream-most stator cascade of the plurality of stator cascades in the fan section.

11. The gas turbine engine of claim 1, wherein there are at least three stator cascades in the plurality of stator cascades and there are at least two rotor cascades in the plurality of rotor cascades that are alternately positioned between the at least three stator cascades.

12. The gas turbine engine of claim 1, wherein the hot side of the heat exchanger is also fluidly connected to at least one of the first turbine section and the second turbine section.

13. The gas turbine engine of claim 1, further comprising:
a second cooling air scoop positioned upstream of the compressor section and subtending only a second sector of the circumference of the gas turbine engine opposite of the first sector of the first cooling air scoop, wherein the second cooling air scoop is radially outward from the splitter, and wherein the inlet to the cooling air stream includes the first and second cooling air scoops.

14. A heat exchanger for a gas turbine engine comprising:
a cooling air scoop defining an inlet to a cooling air stream that is positioned downstream from a fan section of the gas turbine engine, upstream and radially outward from a splitter, wherein the cooling air scoop subtends only a sector of a circumference of the gas turbine engine to receive a portion of the fan air stream, wherein the inlet divides the portion of the fan air stream into the cooling air stream and another portion of the fan air stream and the splitter divides the another portion of the fan air stream into the primary air stream and a secondary air stream radially outward from the primary air stream, the cooling air scoop comprising:
a leading edge nose that is positioned adjacent to a downstream-most stator cascade of the fan section, wherein the leading edge nose is radially aligned with or radially outward from a midspan of the downstream-most stator cascade;
a cold side that is fluidly connected to the cooling air stream via the cooling air scoop, wherein the cooling air stream combines with the secondary air stream downstream from the heat exchanger; and a hot side that is fluidly connected to a compressor section of the gas turbine engine.

15. The heat exchanger of claim 14, wherein the sector is between a first strut and a second strut that are positioned downstream of the downstream-most stator cascade.

16. The heat exchanger of claim 15, wherein the first strut is adjacent to the second strut.

17. The heat exchanger of claim 14, wherein the leading edge nose is positioned at a leading edge of the downstream-most stator cascade.

18. The heat exchanger of claim 14, wherein the leading edge nose is positioned at a trailing edge of the downstream-most stator cascade.

19. The heat exchanger of claim 14, wherein the leading edge nose is positioned between a leading edge and a trailing edge of the downstream-most stator cascade.

20. The heat exchanger of claim 14,
wherein the splitter is positioned downstream of the fan section; and
wherein the leading edge nose extends upstream from the splitter.

* * * * *